us011155142B2

(12) United States Patent
Kaltsounis et al.

(10) Patent No.: US 11,155,142 B2
(45) Date of Patent: Oct. 26, 2021

(54) WATER SEPARATING AIR INDUCTION SYSTEM

(71) Applicants: Nicholas O Kaltsounis, Rochester Hills, MI (US); Chad J Vermeulen, Windsor (CA)

(72) Inventors: Nicholas O Kaltsounis, Rochester Hills, MI (US); Chad J Vermeulen, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 84 days.

(21) Appl. No.: 16/749,567

(22) Filed: Jan. 22, 2020

(65) Prior Publication Data

US 2021/0221198 A1 Jul. 22, 2021

(51) Int. Cl.
*B60H 1/28* (2006.01)

(52) U.S. Cl.
CPC ..................................... *B60H 1/28* (2013.01)

(58) Field of Classification Search
CPC ............................... B60H 1/28; B62D 25/081
USPC ................................................ 454/147, 157
See application file for complete search history.

(56) References Cited

U.S. PATENT DOCUMENTS

| | | | |
|---|---|---|---|
| 4,646,864 A | 3/1987 | Racchi | |
| 4,850,444 A | 7/1989 | Bojanowski et al. | |
| 5,950,753 A | 9/1999 | Muldoon et al. | |
| 9,764,776 B2 | 9/2017 | Vigil et al. | |
| 9,776,579 B1 | 10/2017 | Delaney et al. | |
| 9,802,458 B2 * | 10/2017 | Harke | F25D 21/14 |
| 10,035,405 B2 | 7/2018 | Hoke et al. | |
| 10,266,212 B2 | 4/2019 | Overgaard et al. | |
| 10,391,856 B2 | 8/2019 | Glickman | |
| 10,457,333 B1 * | 10/2019 | Allen | B62D 25/14 |
| 2006/0201727 A1 | 9/2006 | Chan | |
| 2010/0201157 A1 * | 8/2010 | Daab | B62D 25/081 |
| | | | 296/192 |
| 2019/0210660 A1 | 7/2019 | Overgaard et al. | |

\* cited by examiner

*Primary Examiner* — Jessica Yuen
(74) *Attorney, Agent, or Firm* — Ralph E. Smith (57) ABSTRACT

A hood air intake and water separation system includes a first separation chamber having a first inlet fluidly coupled to a hood intake vent of the vehicle, a first outlet, and at least one first drain opening. The first separation chamber is configured to separate water and air ingested through the intake and direct the separated water through the at least one first drain opening and direct the separated air through the first outlet. A second separation chamber includes a second inlet fluidly coupled to the first separation chamber first outlet, a second outlet, and at least one second drain opening. A third chamber includes a third inlet fluidly coupled to the second separation chamber second outlet, and a third outlet. The first and second separation chambers are configured to direct ingested water away from an airpath to the engine.

20 Claims, 7 Drawing Sheets

WATER SEPARATING AIR INDUCTION SYSTEM

FIELD

The present application relates generally to vehicle air induction systems and, more particularly, to air and water separation systems for a forward mounted air intake of a vehicle.

BACKGROUND

Some vehicles include forward mounted air intakes in hoods or grilles to improve engine efficiency, for example, in high performance applications. The forward facing position of the intake allows for relatively cooler air, as opposed to warm underhood air, to enter the engine, which improves engine power. However, in some situations such as water fording, due to the forward positioning, the air intake may expose the air induction system, and ultimately the engine, to debris and high volumes of water. To prevent water ingestion, some vehicles include additional water prevention systems such as, for example, snorkels. However, such systems can be long and highly restrictive to intake airflow, thereby decreasing engine performance during typical road driving conditions. Thus, while such conventional systems do work well for their intended purpose, there remains a desire for improvement in the relevant art.

SUMMARY

According to one example aspect of the invention, a hood air intake and water separation system for a vehicle having an air induction system for supplying intake air to an engine is provided. In one example configuration, the hood air intake and water separation system includes a first separation chamber having a first inlet fluidly coupled to a hood intake vent of the vehicle, a first outlet, and at least one first drain opening. The first separation chamber is configured to separate water and air ingested through the intake and direct the separated water through the at least one first drain opening and direct the separated air through the first outlet. A second separation chamber includes a second inlet fluidly coupled to the first separation chamber first outlet, a second outlet, and at least one second drain opening. The second separation chamber is configured to separate water and air ingested through the second inlet and direct the separated water through the at least one second drain opening and direct the separated air through the second outlet. A third chamber includes a third inlet fluidly coupled to the second separation chamber second outlet, and a third outlet. The third separation chamber is configured to direct air ingested through the third inlet to the third outlet to the air induction system. The first and second separation chambers are configured to direct ingested water away from an airpath to the engine.

In addition to the foregoing, the described system may include one or more of the following features: wherein the first separation chamber includes a rear drainage wall defining the at least one first drain opening, and wherein a door is configured to selectively close each first drain opening; wherein each door is angled such that each door is moved to a closed position by gravity, and wherein at least one of momentum and hydrostatic force of the ingested water is configured to open each door; wherein the at least one first drain opening comprises three first drain openings and doors; and wherein each door is a flexible flapper having a top edge coupled to the rear drainage wall.

In addition to the foregoing, the described system may include one or more of the following features: wherein the first separation chamber includes a floor sloping downwardly toward the at least one first drain opening to define an airflow gap for the separated air to flow to the first outlet; wherein the floor includes at least one directional fin configured to direct the ingested water toward the at least one first drain opening and away from the first outlet; and wherein the first outlet is located at a higher elevation than the at least one first drain opening.

In addition to the foregoing, the described system may include one or more of the following features: wherein the second separation chamber includes a rear drainage wall defining the at least one second drain opening, and wherein a door is configured to selectively close each drain opening; wherein each door is angled such that each door is moved to a closed position by gravity, and wherein at least one of momentum and hydrostatic force of the ingested water is configured to open each door; wherein the at least one second drain opening comprises one drain opening; and wherein each door is a flexible flapper having a top edge coupled to the rear drainage wall.

In addition to the foregoing, the described system may include one or more of the following features: wherein the second separation chamber includes a floor sloping downwardly toward the at least one second drain opening to define an airflow gap for the separated air to flow to the second outlet; wherein the second outlet is located at a higher elevation than the at least one second drain opening; and wherein the third chamber includes a rear wall having at least one auxiliary intake port configured to receive an intake airflow from an engine compartment of the vehicle if airflow is obstructed through at least one of the intake hood vent, the first separation chamber, and the second separation chamber.

According to another example aspect of the invention, a vehicle is provided. In one example configuration, the vehicle includes a front hood assembly configured to at least partially enclose an engine compartment and including a hood body defining a hood air intake vent, an engine disposed within the engine compartment, an air induction system configured to supply intake air to the engine, and a hood air intake and water separation system fluidly coupled between the hood air intake vent and the air induction system. The hood air intake and water separation system includes a first separation chamber having a first inlet fluidly coupled to a hood intake vent of the vehicle, a first outlet, and at least one first drain opening. The first separation chamber is configured to separate water and air ingested through the intake and direct the separated water through the at least one first drain opening and direct the separated air through the first outlet. A second separation chamber includes a second inlet fluidly coupled to the first separation chamber first outlet, a second outlet, and at least one second drain opening. The second separation chamber is configured to separate water and air ingested through the second inlet and direct the separated water through the at least one second drain opening and direct the separated air through the second outlet. A third chamber includes a third inlet fluidly coupled to the second separation chamber second outlet, and a third outlet. The third separation chamber is configured to direct air ingested through the third inlet to the third outlet to the air induction system. The first and second separation chambers are configured to direct ingested water away from an airpath to the engine.

In addition to the foregoing, the described vehicle may include one or more of the following features: a user display, at least one sensor disposed within the hood air intake and water separation system, and a controller in signal communication with the user display and the at least one sensor; and a temperature sensor disposed within the third chamber and configured to monitor an air temperature therein to facilitate detecting an obstruction in the hood air intake and water separation system.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

The present application is directed to a hood air intake and water separation system for a vehicle. The hood air intake and water separation system includes three chambers or stages configured to separate and direct air and water such that the water is prevented from entering the vehicle air induction system. The first chamber includes one or more water drains, the second chamber includes one or more auxiliary water drains, and the third chamber includes one or more auxiliary air intake vents to provide an auxiliary air intake in the event one or more of the three chambers are obstructed.

Figure 1:
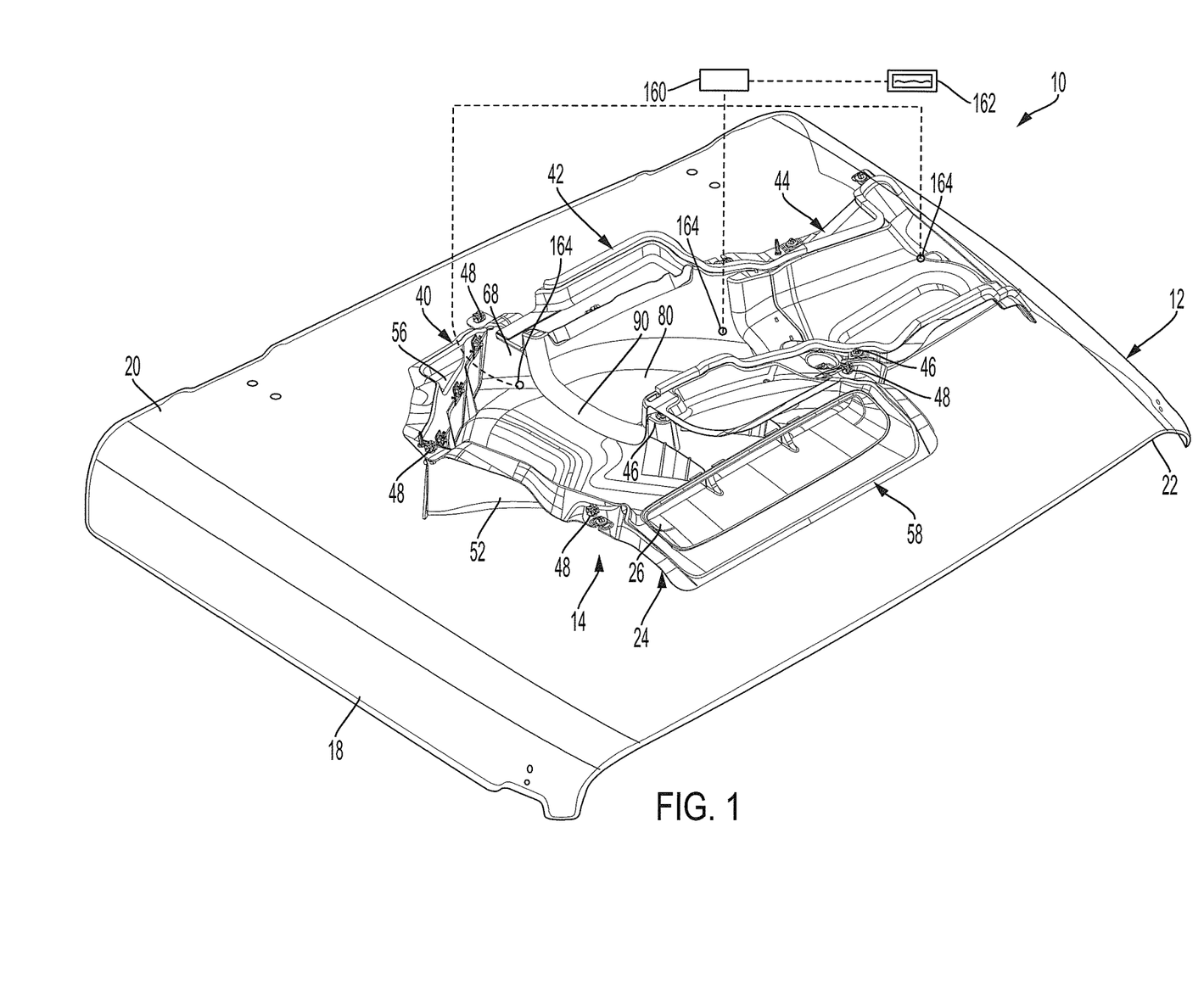
FIG. 1 is a top perspective view of an example hood air intake and water separation system coupled to an inside of a vehicle hood shown in phantom, in accordance with the principles of the present disclosure.
Figure 7:
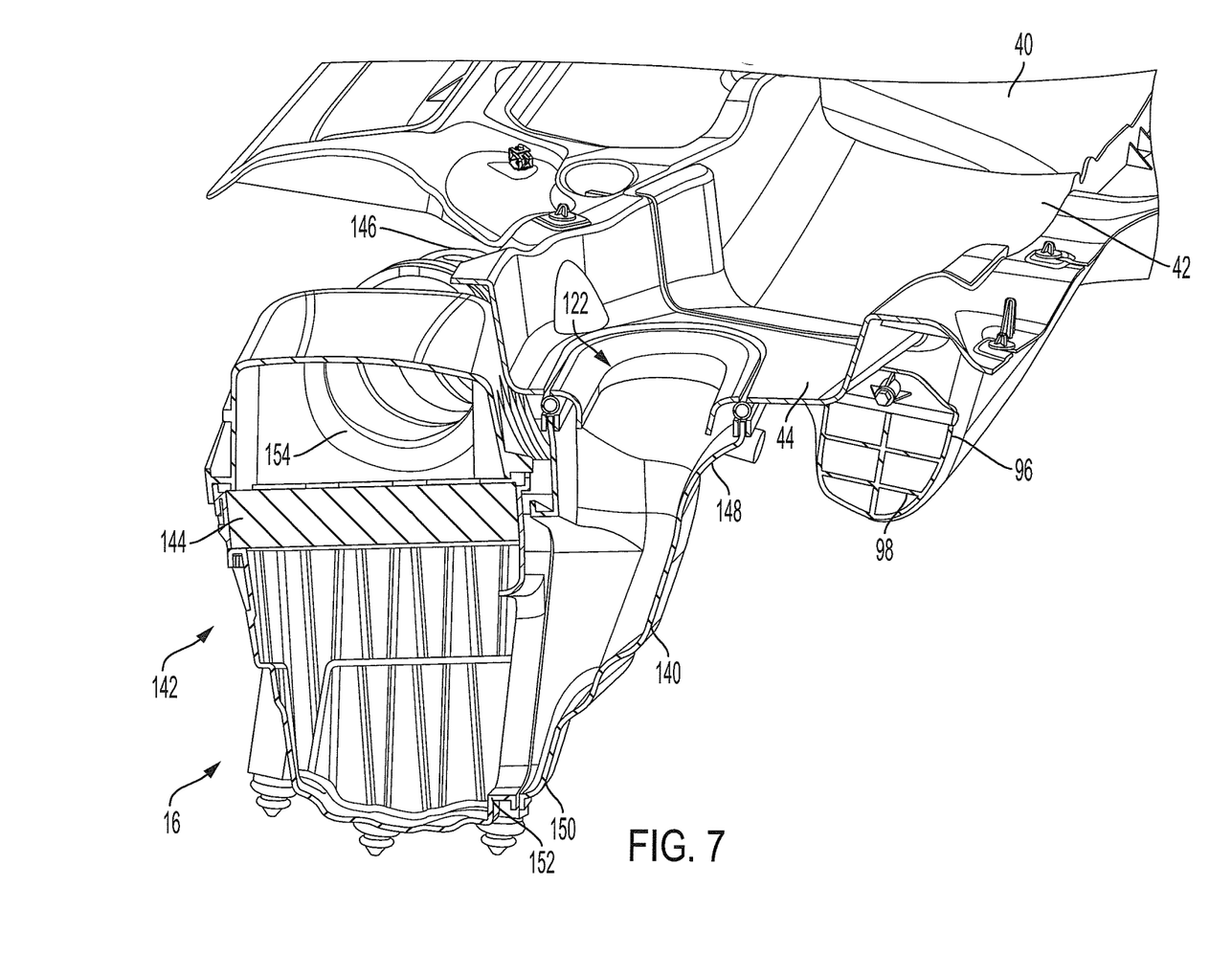
FIG. 7 is a partial cutaway view of an example air induction system with the hood air intake and water separation system shown in FIG. 1, in accordance with the principles of the present disclosure.

Referring now to the drawings, FIG. 1 illustrates a vehicle 10 generally having a front hood assembly 12 with a hood air intake and water separation system 14 configured to supply intake air to an air induction system 16 (FIG. 7). The front hood assembly 12 is configured to rotatably couple to a vehicle body (not shown) and generally includes a hood body 18 having an upper outer surface 20 and a lower inner surface 22. The hood body 18 includes a hood intake vent 24 that defines an opening 26 configured to selectively receive a grille (not shown). The hood intake vent 24 is configured to receive ambient air therethrough for supplying the air induction system 16 with intake air. The grille is configured to prevent larger debris from passing through the hood intake vent 24 and obstructing airflow in the hood air intake and water separation system 14 or air induction system 16. However, because the hood intake vent 24 is in a forward facing position, it is unable to prevent ingestion of water, for example, during high water fording. In this way, the hood air intake and water separation system 14 is configured to separate water and air to facilitate preventing water from reaching the air induction system 16, which could cause damage to an engine (not shown) of the vehicle 10, as described herein in more detail.

With additional reference to FIGS. 1-4, the hood air intake and water separation system 14 will be described in more detail. In the example embodiment, the hood air intake and water separation system 14 is coupled to the hood inner surface 22 and configured to separate air and water entering the hood intake vent 24. As illustrated, the hood air intake and water separation system 14 generally includes a first section or separation chamber 40, a second section or separation chamber 42, and a third section or chamber 44. In the example embodiment, the third chamber 44 is coupled to and overlaps the second separation chamber 42, which is coupled to and overlaps the first separation chamber 40. The three chambers 40, 42, 44 may be integrally formed or separate and distinct components coupled to each other by any suitable means such as, for example, the illustrated fasteners 46. Similarly, the three chambers 40, 42, 44 are coupled to the hood inner surface 22 by any suitable means such as, for example the illustrated clips or fasteners 48.

With additional reference to FIG. 5, the first separation chamber 40 will be described in more detail. In the example embodiment, the first separation chamber generally includes a floor 50 (FIG. 4), a first sidewall 52 (FIG. 1), a second sidewall 54, and a rear drainage wall 56. As illustrated, the floor 50 and sidewalls 52, 54 converge to define an inlet end 58 configured to be disposed against the hood intake vent 24 opening 26 such that the first separation chamber 40 is operable to receive ambient air therethrough. The rear drainage wall 56 extends upwardly from floor 50 and extends between the first and second sidewalls 52, 54.

Figure 3:
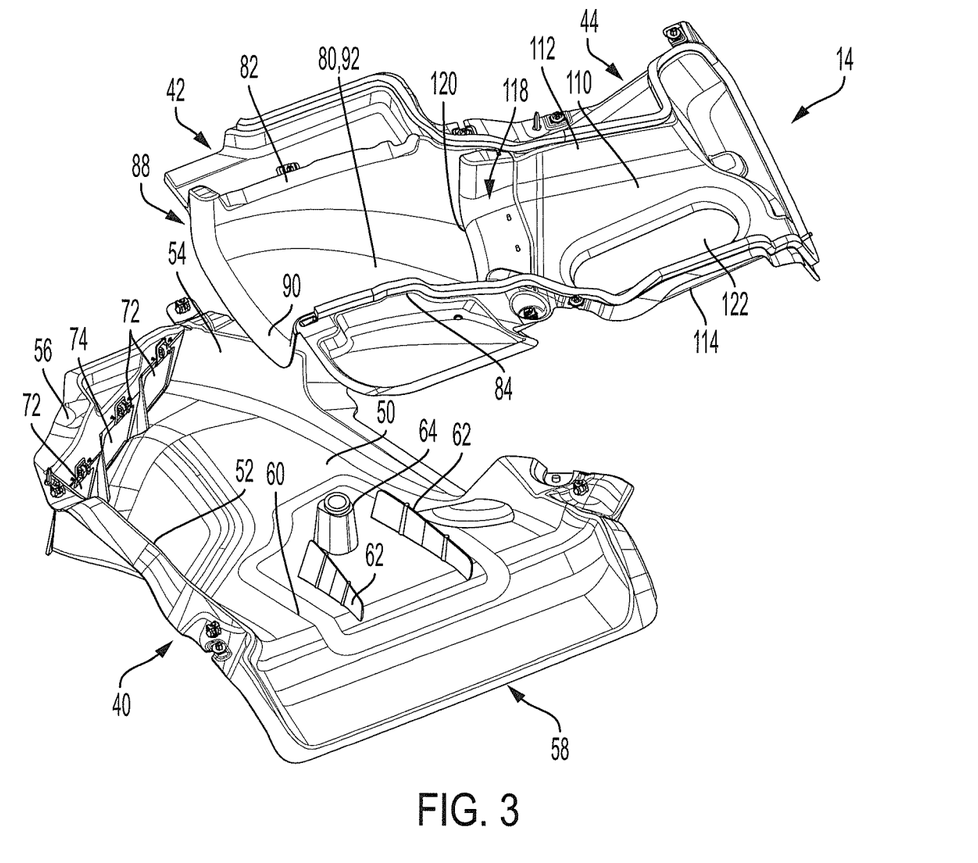
FIG. 3 is an exploded top perspective view of the hood air intake and water separation system shown in FIG. 1, in accordance with the principles of the present disclosure.
Figure 4:
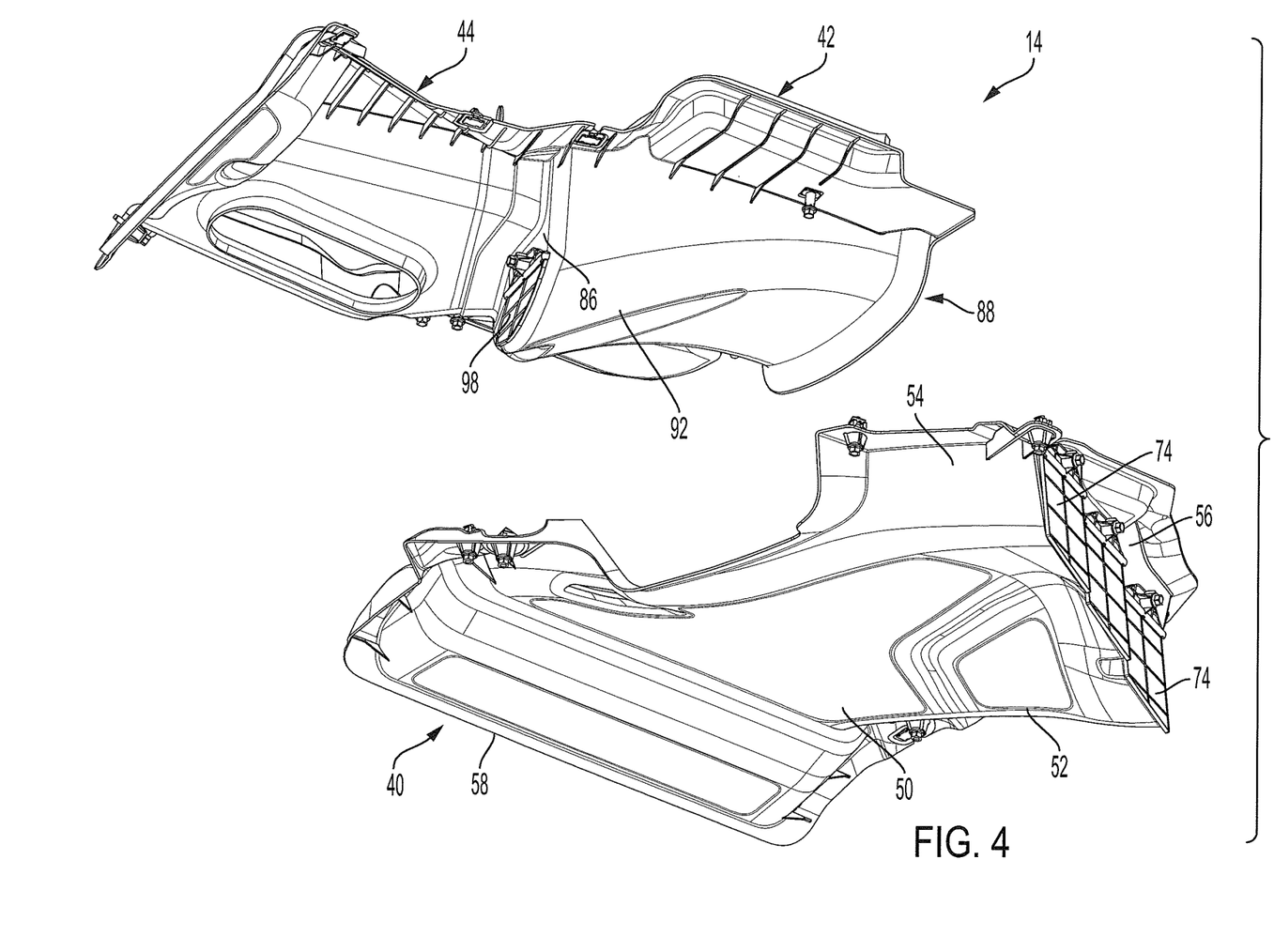
FIG. 4 is bottom perspective view of the hood air intake and water separation system shown in FIG. 3, in accordance with the principles of the present disclosure.

In the example embodiment, toward the inlet end 58, the floor 50 defines a downwardly sloped ramp 60 having one or more directional fins 62 (two shown) and a structural post 64 extending upwardly therefrom. As noted above, in some situations such as water fording, both water and air may enter the hood intake vent 24 and into the first separation chamber 40. In the illustrated example, the directional fins 62 are angled or curved (toward the left as shown in FIGS. 3, 5) to facilitate directing water toward the rear drainage wall 56, as shown by arrows 66. Additionally, the downward slope of ramp 60 facilitates flowing the water toward the rear drainage wall 56 while also increasing a distance between the floor 50 and the second separation chamber 42 to define an airflow chamber or gap 68 to receive an airflow (shown by arrows 70) from the hood intake vent 24 to an outlet of the first separation chamber 40 into the second separation chamber 42. As such, the outlet of the first separation chamber 40 is disposed at a higher elevation than the inlet 58 to facilitate drainage. The structural post 64 is configured to support the second separation chamber 42 and receive one fastener 46 for coupling therebetween.

Figure 5:
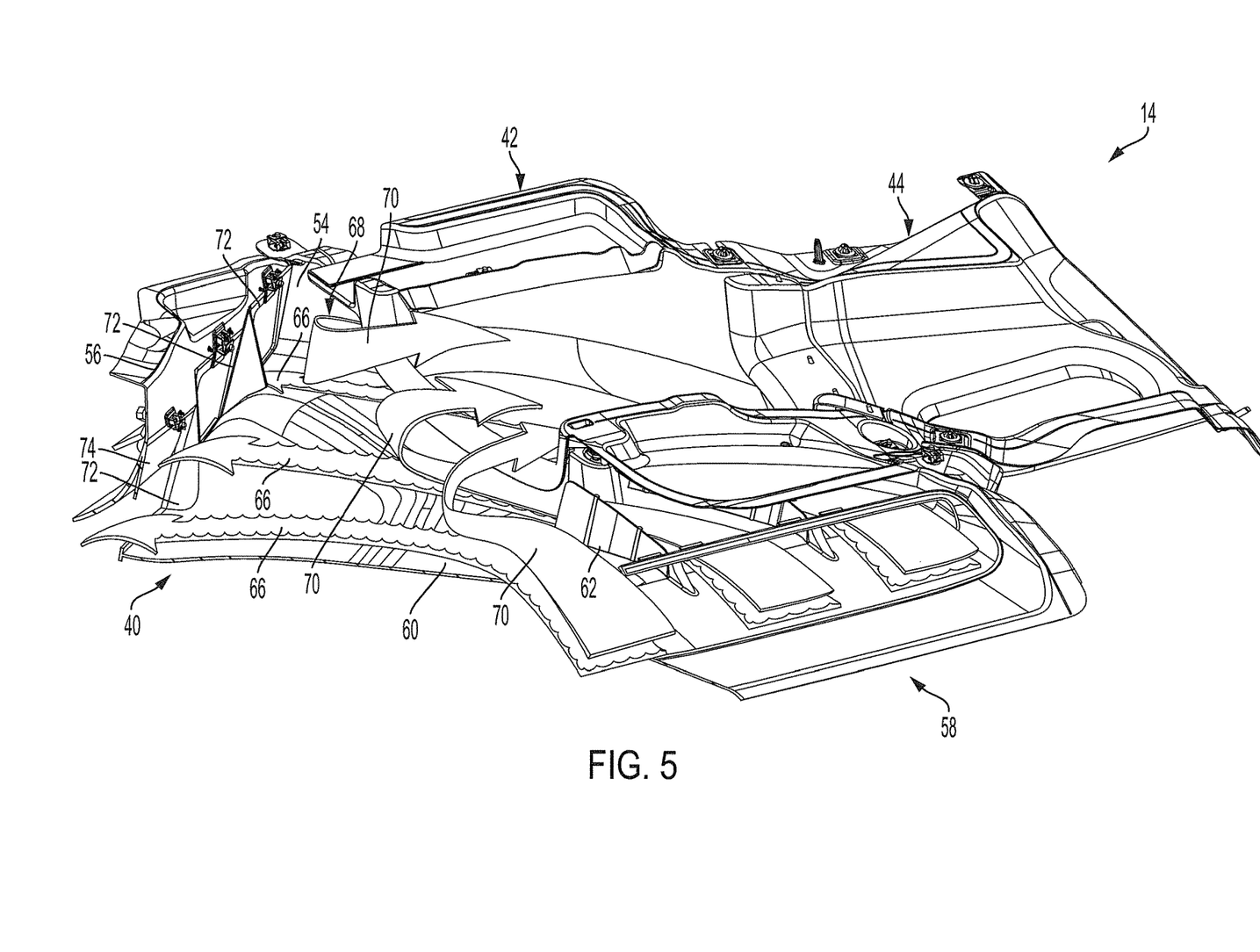
FIG. 5 is a partial cutaway view of a first separation chamber of the hood air intake and water separation system shown in FIG. 1, in accordance with the principles of the present disclosure.

With continued reference to FIG. 5, the sidewalls 52, 54 are also configured to angle and direct water entering the hood intake vent 24 away from the second separation chamber 42 and toward the rear drainage wall 56. In the example embodiment, the rear drainage wall 56 defines a plurality of drain openings 72 each having a door 74 configured to open when contacted by the flow of water to thereby drain water entering the first separation chamber 40 and enable the separated air to flow into the second separation chamber 42. The drain openings 72 are shaped and sized to handle a predetermined amount of water or water flow. In the illustrated example, the drainage doors 74 are flexible flappers having a top edge 76 coupled to the rear drainage wall 56. In some examples, the drainage doors 74 are opened by a combination of water momentum and hydrostatic force.

Figure 2:
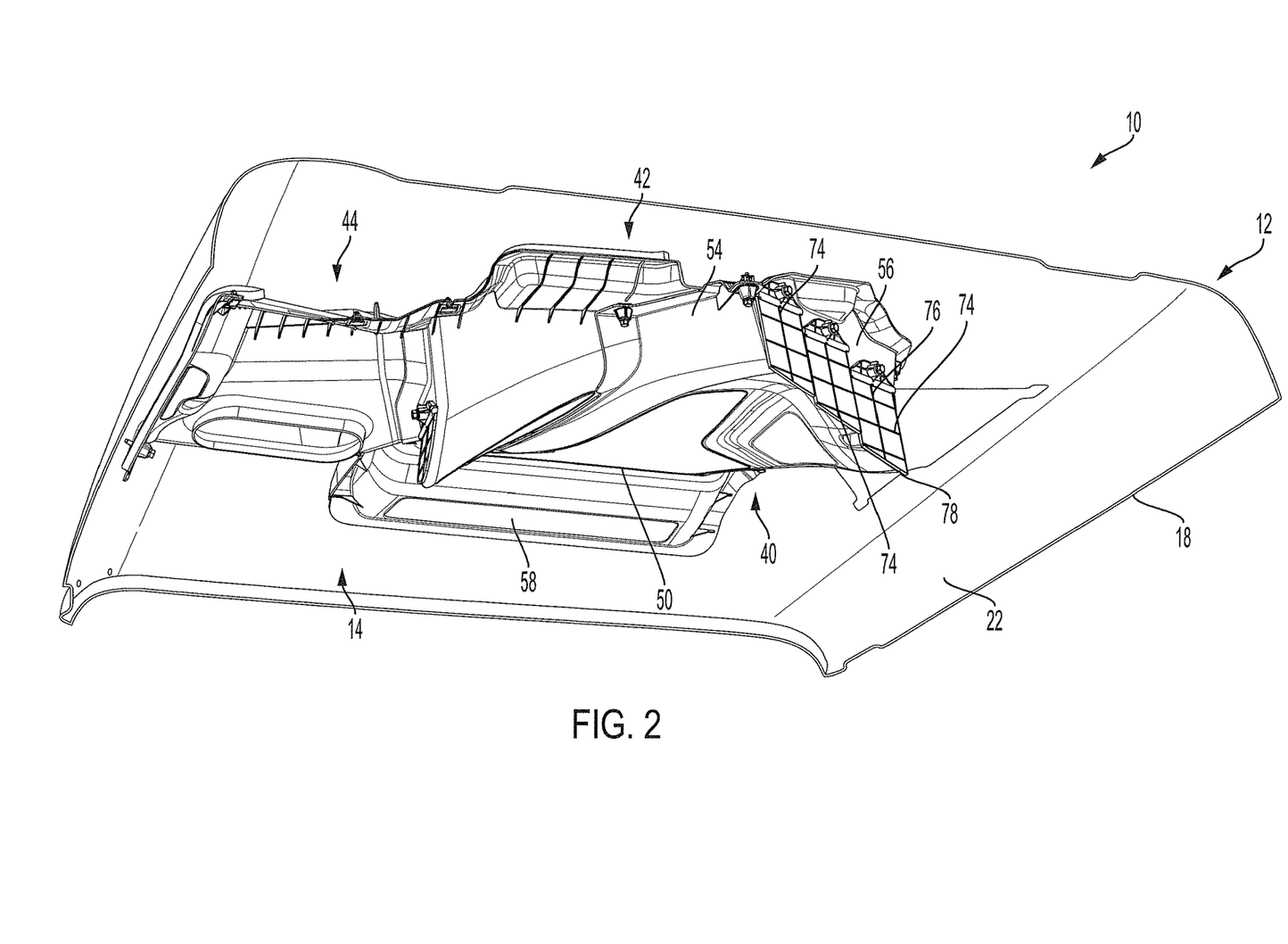
FIG. 2 is a bottom perspective view of the hood air intake and water separation system shown in FIG. 1, in accordance with the principles of the present disclosure.

As shown in FIG. 2, in the example embodiment, the drain openings 72 and drainage doors 74 are angled rearwardly such that a bottom edge 78 of the door 74 is disposed rearward of the top edge 76. In this way, gravity facilitates keeping the doors 74 closed. It will be appreciated, however, that any suitable type of door/flap and method of coupling to the rear drainage wall 56 may be utilized that enables system 14 to function as described herein. Moreover, while illustrated as having three drain openings 72 and associated drainage doors 74, it will be appreciated that first separation chamber 40 can have any desired number of drain openings 72 and associated drainage doors 74 depending on the amount of water the system is desired to handle.

Accordingly, as illustrated in FIG. 5, water entering the first separation chamber 40 via the hood intake vent 24 is directed toward the rear drainage wall 56 and out of drain openings 72 to facilitate preventing water from entering the air induction system 16 and thus the vehicle engine. However, in the event that the volume of water entering the first separation chamber 40 is so great as to fill the first chamber 40 and airflow gap 68, the rising water will spill over through the outlet of the first separation chamber 40 and into the second separation chamber 42 with the airflow 70.

Figure 6:
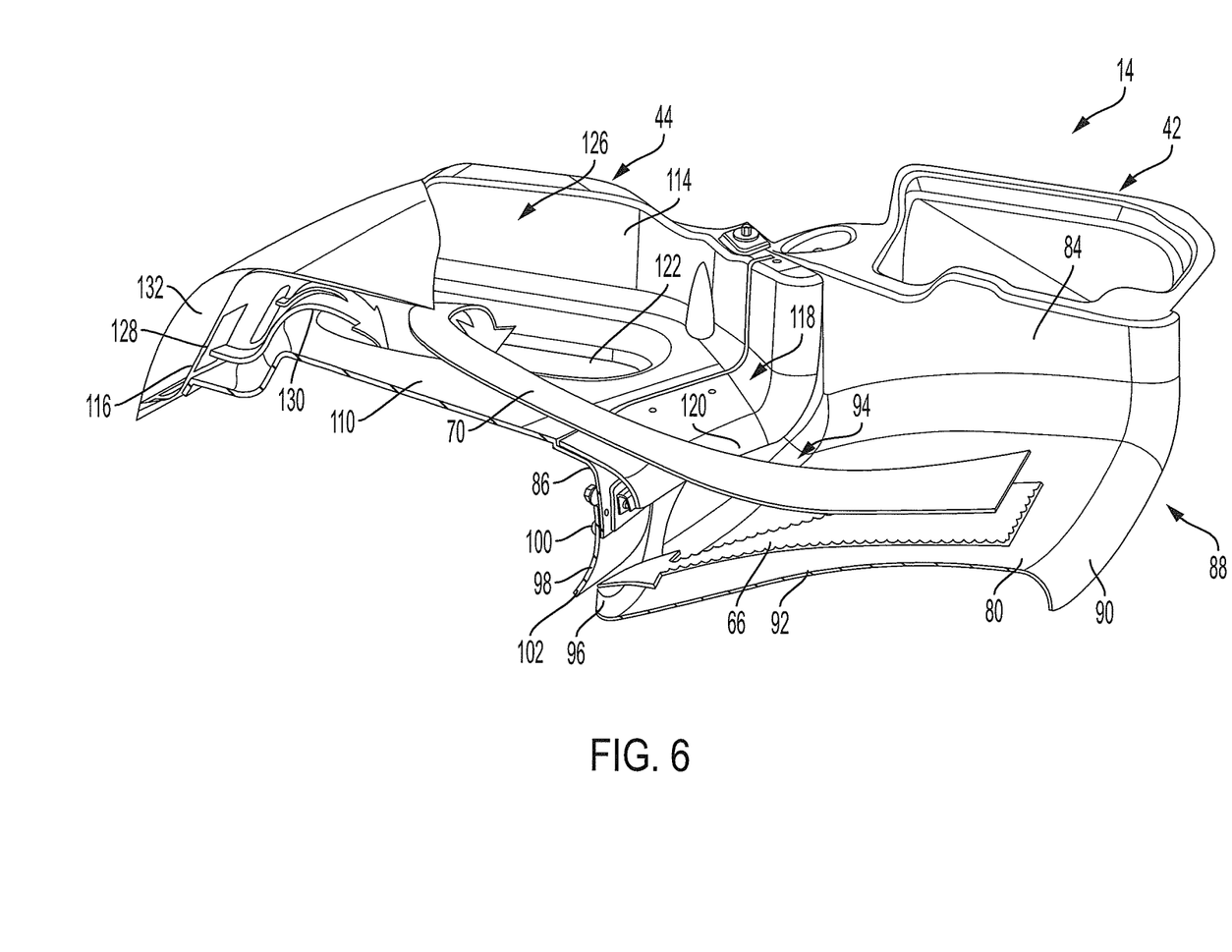
FIG. 6 is a partial cutaway view of a second and third separation chamber of the hood air intake and water separation system shown in FIG. 1, in accordance with the principles of the present disclosure.

With additional reference to FIG. 6, the second separation chamber 42 will be described in more detail. In the example embodiment, the second separation chamber 42 is configured to receive airflow and water overflow from the first separation chamber 40 and generally includes a floor 80, a first sidewall 82 (FIG. 3), a second sidewall 84, and a rear drainage wall 86. As illustrated, the floor 80 and sidewalls 82, 84 converge to define an inlet end 88 configured to be disposed within the first separation chamber 40, as shown in FIGS. 5 and 6. The inlet end 88 is disposed at a top or upper end of the first separation chamber 40 so as to be elevated from the drain openings 72 to facilitate preventing water entering the second separation chamber 42 until the first separation chamber 40 is completely or at least substantially flooded. Moreover, the inlet end convergence further defines a bellmouth or lip 90 configured to prevent waterflow 66 between the first and second separation chambers 40, 42 from splashing and entering the inlet end 88 while also providing a smooth surface for inlet 88 to improve airflow into the second chamber 42.

In the example embodiment, the rear drainage wall 86 extends upwardly from floor 80 and extends between the first and second sidewalls 82, 84. As shown, the floor 80 defines a ramp 92 sloping downwardly from the inlet end 88 to the rear drainage wall 86. In the situation where the water level has risen high enough for the water to enter the second separation chamber 42, both water and air enter the inlet end 88. The downward slope of ramp 92 facilitates flowing the water toward the rear drainage wall 86 while also increasing a distance between the floor 80 and the third separation chamber 44 to define an airflow chamber or gap 94 to receive airflow 70 from the first separation chamber 40. As such, the outlet of the second separation chamber 42 is disposed at a higher elevation than the inlet 88 to facilitate drainage.

In the example implementation, the sidewalls 82, 84 are also configured to direct water entering the second separation chamber 42 toward the rear drainage wall 86. In the example embodiment, the rear drainage wall 86 defines one or more drain openings 96 each having a door 98 configured to open when contacted by the flow of water to thereby drain water entering the second separation chamber 42 and enable the separated air to flow into the third chamber 44. In the illustrated example, the drainage doors 98 are flexible flappers having a top edge 100 coupled to the rear drainage wall 86.

As shown in FIG. 6, the drain opening 96 and drainage door 98 are angled rearwardly such that a bottom edge 102 of the door 98 is disposed rearward of the top edge 100. In this way, gravity facilitates keeping the door 98 closed. It will be appreciated that any suitable doors/flaps and methods of coupling to the rear drainage wall 86 may be utilized that enables system 14 to function as described herein. Moreover, while illustrated as one drain opening 96 and associated drainage door 98, it will be appreciated that second separation chamber 42 can have any desired number of drain openings 96 and associated drainage doors 98 depending on the amount of water the system is desired to handle.

Accordingly, as illustrated in FIG. 6, water entering the second separation chamber 40 via the inlet 88 is directed toward the rear drainage wall 86 and out of drain opening 96 to facilitate preventing water from entering the air induction system 16 and thus the vehicle engine.

With continued reference to FIG. 6, the third chamber 44 will be described in more detail. In the example embodiment, the third chamber 44 is configured to receive the airflow 70 from the second separation chamber 42 and generally includes a floor 110, a first sidewall 112 (FIG. 3), a second sidewall 114, and a rear wall 116. In the example embodiment, rear wall 116 is a portion of the front hood assembly 12. However, it will be appreciated that the third chamber 44 can include the rear wall 116. Moreover, in the example embodiment, third chamber 44 is formed integrally with the second separation chamber 42. Alternatively, third chamber 44 is separate and distinct from both the first and second separation chambers 40, 42.

As illustrated, the floor 110 and sidewalls 112, 114 converge to define an inlet 118 configured to be disposed within the second separation chamber 42, as shown in FIGS. 5 and 6. The inlet 118 is disposed at a top or upper end of the second separation chamber 42 so as to be elevated from drain opening 96 to facilitate preventing water from entering the third chamber 44. As shown, the inlet 118 defines a bellmouth or lip 120 configured to prevent waterflow 66 between the second and third chambers 42, 44 from splashing and entering the inlet 118 while also providing a smooth surface for inlet 118 to improve airflow into third chamber 44.

In the example embodiment, the floor 110 defines an outlet 122 that is fluidly coupled to the air induction system 16 and configured to supply the airflow 70 thereto. In some embodiments, the floor 110 also defines a plurality of bypass valves (not shown) configured to enable auxiliary flow to the air induction system 16 if system 14 is obstructed (e.g., by snowpack). The sidewalls 112, 114, along with the hood body 18 (including rear wall 116), define an enclosure 126 configured to direct the airflow 70 into the outlet 122. Additionally, the rear wall 116 includes one or more auxiliary intake ports 128 configured to receive an airflow 130 (FIG. 6) from the engine compartment 132 if airflow through one or more portions of hood intake vent 24, first separation chamber 40, second separation chamber 42 is obstructed. Accordingly, hood air intake and water separation system 14 is configured to separate incoming water and air, drain the water from the system 14, and supply the separated intake air to the air induction system 16.

With additional reference to FIG. 7, the air induction system 16 will be described in more detail. In the example embodiment, air induction system 16 generally includes an intake port 140, an air box 142 having an air filter 144, and an air induction duct 146. The intake port 140 includes an inlet 148 and an outlet 150. The inlet 148 is fluidly connected to the third chamber outlet 122, and the outlet 150 is fluidly connected to air box 142, which includes an inlet 152 and an outlet 154. Air supplied to the air box 142 from the intake port 140, is subsequently passed through the air filter 144 and enters duct 146 via the air box outlet 154. The duct 146 subsequently supplies air to a charger or engine intake manifold (not shown). It will be appreciated, however, that air induction system 16 may have various other configurations based on the packaging space and various other requirements of a particular vehicle.

With continued reference to FIG. 1, in one example, vehicle 10 includes a controller 160 (e.g., an ECU) is signal communication with a user interface or user in-vehicle display 162 (e.g., infotainment center display, instrument panel cluster display, etc.) and a plurality of sensors 164 operably associated with the hood air intake and water separation system 14. The sensors 164 may include any suitable type of sensor to provide information about a condition or operational state of the system 14 such as, for example, water or water level sensors and temperature sensors. In some examples, the drainage doors 74 are actuated from a closed position to an open position by the controller 160 based on signals from the sensors 164. Further, the controller 160 can be configured to provide various information about the vehicle and system 14 to a user/driver via the display 162, based at least in part on signals from the sensors 164.

As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

Described herein are systems and methods for separating water and air in a forward mounted air intake. The system utilizes three chambers to separate water and air by utilizing their different densities and viscosity. Water entering the forward mounted intake system is directed away from the engine's air path by the shape of the chambers to a group of flapper doors where the water is ejected out of the air induction system. The flappers are angled so they rest in the home positions via gravity, are configured not to be pulled into the air induction system under vacuum, and are configured to be pushed out of the way by the momentum of the water being ejected. Although described with three chambers, any suitable number of chambers may be utilized depending on the desired amount of water to be separated.

From chamber to chamber, an air path opening is angled away from the direction of the water flow, creating a slightly tortuous path for the air and increasing cross-sectional area to facilitate separating the water and air. If any opening becomes highly restrictive due to blockages (e.g., debris or water), valves or ports located throughout the chambers are configured to allow alternative air paths. Advantageously, the separate chambers allow for easy removal and cleaning, allow the air intake to be positioned under the water level during water fording, and due to the increased cross-sectional area, offer a less restrictive air flow path to the engine, allowing for better efficiency during typical road operations. As such, the described systems solve some major issues of forward facing air intakes; namely, restrictive flow paths (e.g., snorkels) and separation of large amount of water from the air stream being directed to the engine.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A hood air intake and water separation system for a vehicle having an air induction system for supplying intake air to an engine, the system comprising:
   a first separation chamber having a first inlet fluidly coupled to a hood intake vent of the vehicle, a first outlet, and at least one first drain opening, the first separation chamber configured to separate water and air ingested through the intake and direct the separated water through the at least one first drain opening and direct the separated air through the first outlet;
   a second separation chamber having a second inlet fluidly coupled to the first separation chamber first outlet, a second outlet, and at least one second drain opening, the second separation chamber configured to separate water and air ingested through the second inlet and direct the separated water through the at least one second drain opening and direct the separated air through the second outlet; and
   a third chamber having a third inlet fluidly coupled to the second separation chamber second outlet, and a third outlet, the third separation chamber configured to direct air ingested through the third inlet to the third outlet to the air induction system,
   wherein the first and second separation chambers are configured to direct ingested water away from an air path to the engine.

2. The system of claim 1, wherein the first separation chamber includes a rear drainage wall defining the at least one first drain opening, and wherein a door is configured to selectively close each first drain opening.

3. The system of claim 2, wherein each door is angled such that each door is moved to a closed position by gravity, and wherein at least one of momentum and hydrostatic force of the ingested water is configured to open each door.

4. The system of claim 3, wherein the at least one first drain opening comprises three first drain openings and doors.

5. The system of claim 3, wherein each door is a flexible flapper having a top edge coupled to the rear drainage wall.

6. The system of claim 1, wherein the first separation chamber includes a floor sloping downwardly toward the at least one first drain opening to define an airflow gap for the separated air to flow to the first outlet.

7. The system of claim 6, wherein the floor includes at least one directional fin configured to direct the ingested water toward the at least one first drain opening and away from the first outlet.

8. The system of claim 6, wherein the first outlet is located at a higher elevation than the at least one first drain opening.

9. The system of claim 1, wherein the second separation chamber includes a rear drainage wall defining the at least one second drain opening, and wherein a door is configured to selectively close each drain opening.

10. The system of claim 9, wherein each door is angled such that each door is moved to a closed position by gravity, and wherein at least one of momentum and hydrostatic force of the ingested water is configured to open each door.

11. The system of claim 10, wherein each door is a flexible flapper having a top edge coupled to the rear drainage wall.

12. The system of claim 1, wherein the second separation chamber includes a floor sloping downwardly toward the at least one second drain opening to define an airflow gap for the separated air to flow to the second outlet.

13. The system of claim 12, wherein the second outlet is located at a higher elevation than the at least one second drain opening.

14. The system of claim 1, wherein the third chamber includes a rear wall having at least one auxiliary intake port configured to receive an intake airflow from an engine compartment of the vehicle if airflow is obstructed through at least one of the intake hood vent, the first separation chamber, and the second separation chamber.

15. A vehicle comprising:
a front hood assembly configured to at least partially enclose an engine compartment and including a hood body defining a hood air intake vent;
an engine disposed within the engine compartment;
an air induction system configured to supply intake air to the engine; and
a hood air intake and water separation system fluidly coupled between the hood air intake vent and the air induction system, the hood air intake and water separation system comprising:
a first separation chamber having a first inlet fluidly coupled to a hood intake vent of the vehicle, a first outlet, and at least one first drain opening, the first separation chamber configured to separate water and air ingested through the intake and direct the separated water through the at least one first drain opening and direct the separated air through the first outlet;
a second separation chamber having a second inlet fluidly coupled to the first separation chamber first outlet, a second outlet, and at least one second drain opening, the second separation chamber configured to separate water and air ingested through the second inlet and direct the separated water through the at least one second drain opening and direct the separated air through the second outlet; and
a third chamber having a third inlet fluidly coupled to the second separation chamber second outlet, and a third outlet, the third separation chamber configured to direct air ingested through the third inlet to the third outlet to the air induction system,
wherein the first and second separation chambers are configured to direct ingested water away from an air path to the engine.

16. The vehicle of claim 15, further comprising a temperature sensor disposed within the third chamber and configured to monitor an air temperature therein to facilitate detecting an obstruction in the hood air intake and water separation system.

17. The vehicle of claim 15, wherein:
the first separation chamber includes a rear drainage wall defining the at least one first drain opening,
a door is configured to selectively close each first drain opening,
each door is angled such that each door is moved to a closed position by gravity, and
at least one of momentum and hydrostatic force of the ingested water is configured to open each door.

18. The vehicle of claim 15, wherein:
the first separation chamber includes a floor sloping downwardly toward the at least one first drain opening to define an airflow gap for the separated air to flow to the first outlet, and
the floor includes at least one directional fin configured to direct the ingested water toward the at least one first drain opening and away from the first outlet.

19. The vehicle of claim 15, wherein:
the second separation chamber includes a rear drainage wall defining the at least one second drain opening, and a door is configured to selectively close each drain opening;
each door is angled such that each door is moved to a closed position by gravity, and wherein at least one of momentum and hydrostatic force of the ingested water is configured to open each door; and
the second separation chamber includes a floor sloping downwardly toward the at least one second drain opening to define an airflow gap for the separated air to flow to the second outlet.

20. The vehicle of claim 15, wherein the third chamber includes a rear wall having at least one auxiliary intake port configured to receive an intake airflow from an engine compartment of the vehicle if airflow is obstructed through at least one of the intake hood vent, the first separation chamber, and the second separation chamber.

* * * * *